(12) United States Patent
Kuo (10) Patent No.: US 6,672,454 B1
(45) Date of Patent: Jan. 6, 2004

(54) OPTICAL DISC CASE STRUCTURE

(75) Inventor: Hsien-Tse Kuo, Hsinchu (TW)

(73) Assignee: Prorit Corporation, Miaoli Hsien (TW)

( * ) Notice: Subject to any disclaimer, the term of this patent is extended or adjusted under 35 U.S.C. 154(b) by 1 day.

(21) Appl. No.: 10/178,462

(22) Filed: Jun. 25, 2002

(51) Int. Cl.⁷ .............................................. B65D 85/57
(52) U.S. Cl. .................................. 206/308.1; 206/310
(58) Field of Search .......................... 206/308.1, 308.2, 206/309, 303, 310–313, 307, 493

(56) References Cited

U.S. PATENT DOCUMENTS

| | | | | |
|---|---|---|---|---|
| 4,903,829 A | * | 2/1990 | Clemens ................... | 206/308.1 |
| 5,494,156 A | * | 2/1996 | Nies ............................ | 206/310 |
| 5,660,274 A | * | 8/1997 | Chien ....................... | 206/308.1 |
| 5,829,582 A | * | 11/1998 | Ippolito et al. .......... | 206/308.1 |
| 5,944,181 A | * | 8/1999 | Lau .......................... | 206/308.1 |
| 6,283,282 B1 | * | 9/2001 | Wong et al. ............. | 206/308.1 |
| 6,364,108 B1 | * | 4/2002 | Bin ............................ | 206/310 |
| 6,568,526 B1 | * | 5/2003 | Reinhardt et al. .......... | 206/310 |

* cited by examiner

Primary Examiner—Shian Luong
(74) Attorney, Agent, or Firm—Rosenberg, Klein & Lee (57) ABSTRACT

An optical disc case structure comprises bottom and top covers. A holding member for holding the optical disc is further placed within the case. The holding member is defined from at least an arcuate positioning tongue and an arcuate holding tongue. The arcuate positioning tongue has an inner surface thereof upwardly extending in inclined and taper manners while an outer surface thereof upwardly bends into a rounded profile. The arcuate holding tongue is connected to the bottom board via a connection in which a U-shaped clearance is defined by cutting through the bottom board so that a bottom face of the arcuate holding tongue is inclined. The arcuate holding tongue is integrally inclined outwardly meanwhile projecting toward the received disc. Thereby, the arcuate holding tongue can resiliently deviate to hold the optical disc.

10 Claims, 9 Drawing Sheets

OPTICAL DISC CASE STRUCTURE

BACKGROUND OF THE INVENTION

1. Field of the Invention

The invention relates to an optical disc case structure. More particularly, the invention relates to an ultra-thin case structure for receiving an optical disc having a diameter of 8 cm.

2. Description of the Related Art

Along with the development of information technology, the amount of numerical data that is transferred, processed, and stored becomes tremendous. Optical storage discs, such as compact discs, are presently the principal supports of numerical data storage. The optical discs are conventionally placed within a disc case.

Figure 1:
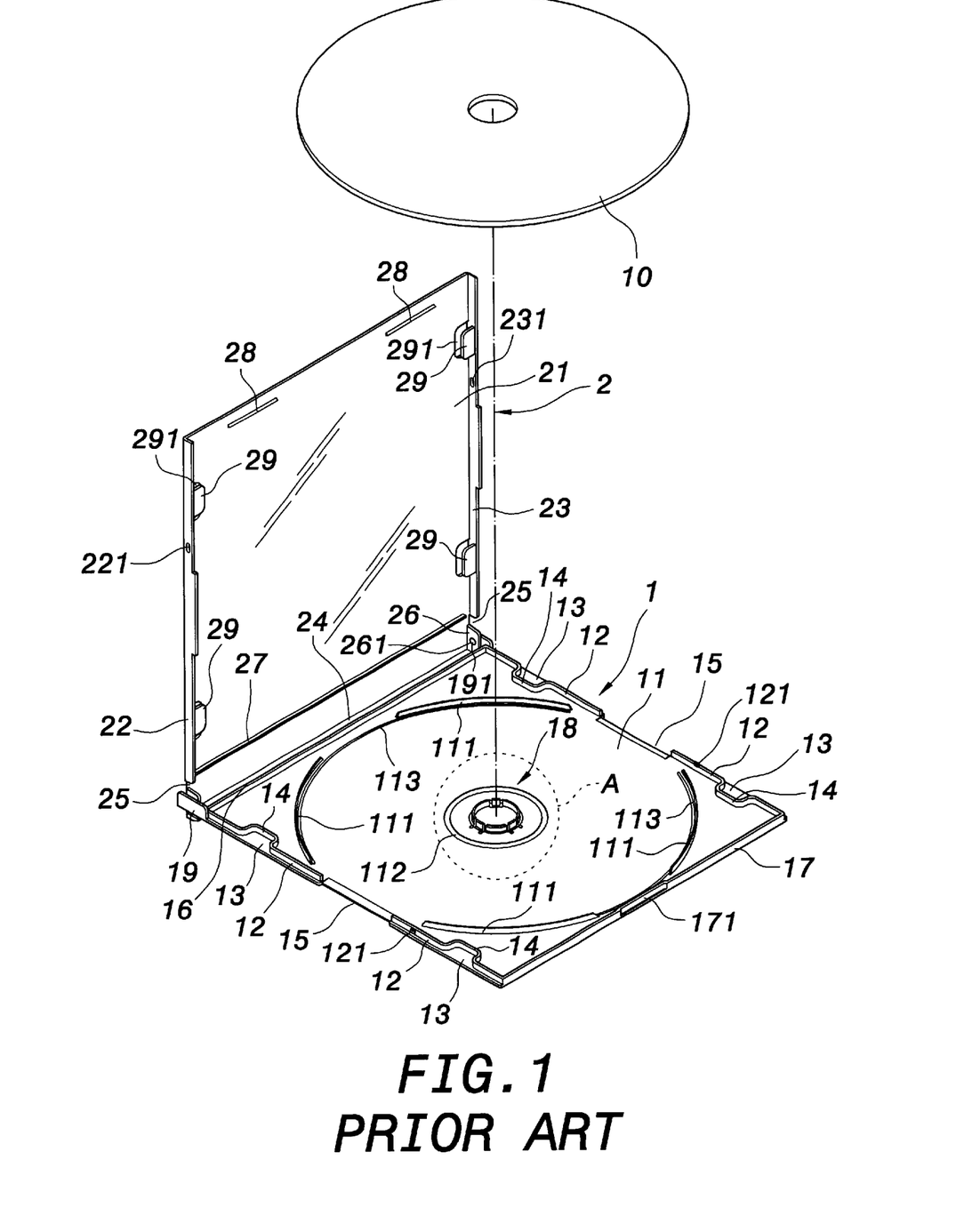
FIG. 1 is a perspective view of a conventional optical disc case structure.
Figure 2:
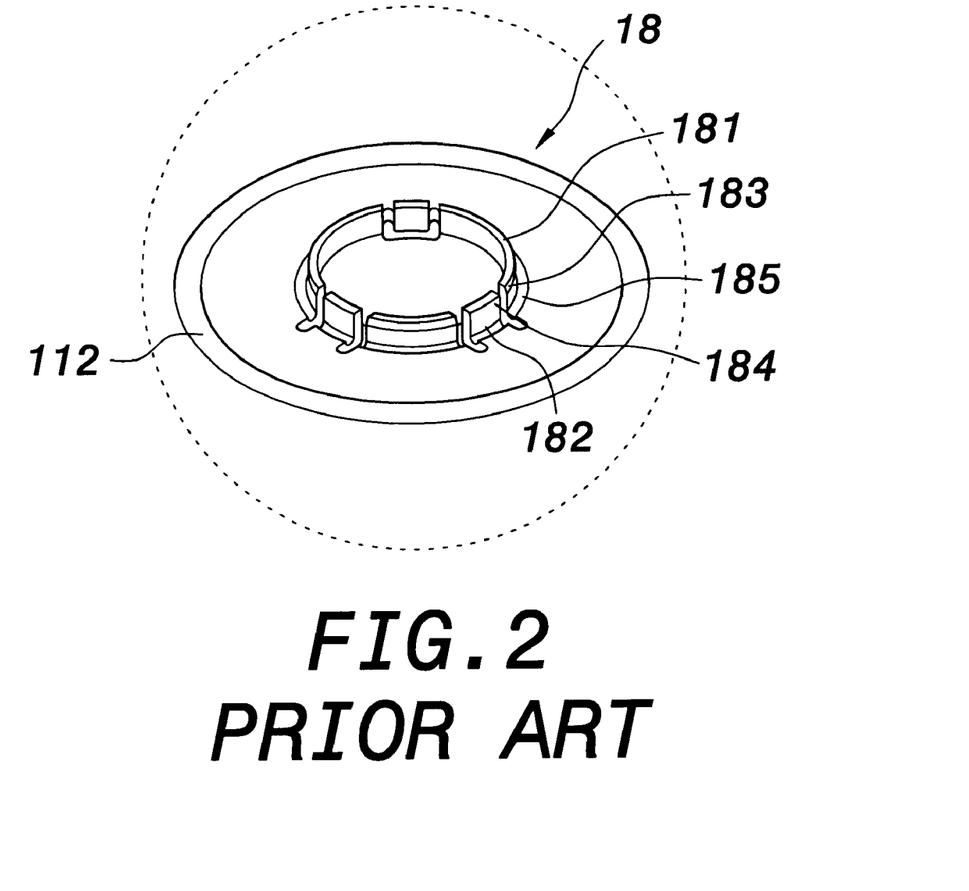
FIG. 2 is an enlarged view of the portion A of FIG. 1.

Referring to FIG. 1 and FIG. 2, two perspective views schematically show the structure of a conventional optical disc case. The conventional disc case usually receives a standard disc 10 having a diameter of 12 cm. The disc case is constructed from a bottom cover 1 and a top cover 2 assembled with each other. The bottom cover 1 includes a bottom board 11 whose front and rear outer peripheries are respectively provided with front and rear peripheral projections 12 that are symmetrical to each other. Each front/rear peripheral projection 12 is composed of two projecting elements that are spaced apart from each other via a groove 15 and, furthermore, respectively define a flange 13 via a recessed portion 14 approximately located at a central position of each projecting element. Left and right peripheral projections 16, 17 further project respectively from a left outer periphery and a right outer periphery. An outer surface of the right peripheral projection 17, at a central portion, is further recessed into an opening groove 171. Each front/rear peripheral projection 12 extends beyond the left peripheral projection 16 into a connecting segment 19 provided with a pivot axle 191.

Figure 3:
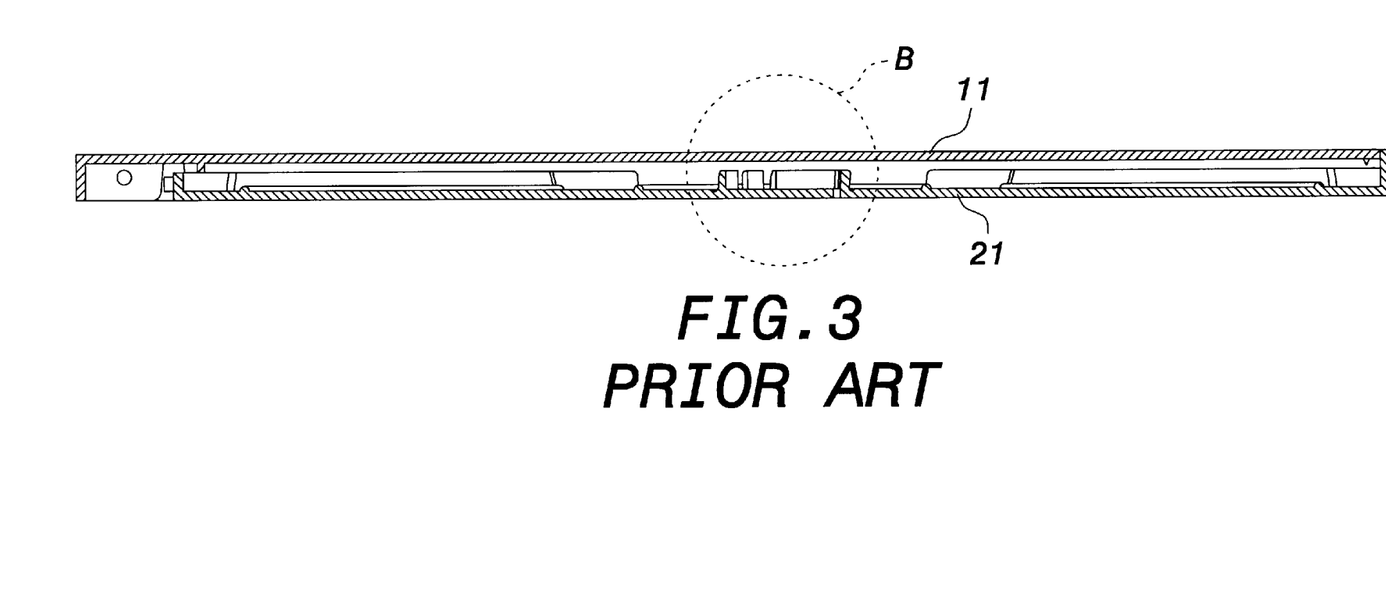
FIG. 3 is a cross-sectional view taken from a transversal section of FIG. 1.
Figure 4:
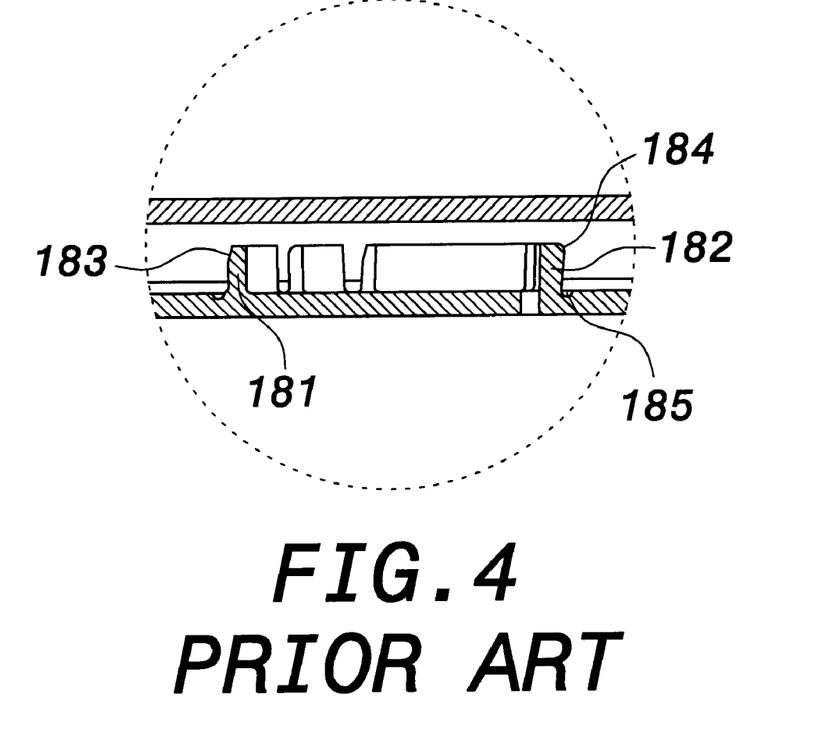
FIG. 4 is an enlarged view of the portion B of FIG. 3.

A top surface of the bottom board 11 is provided with short arcuate projections 111 that are coaxial to one another to fit an outer diameter of the disc 10. The short arcuate projections 11 are conventionally four arcuate projections placed vis-a-vis four corners of the bottom board 11, defined by the connection of the front/rear peripheral projections 12 with the left and right peripheral projections 16, 17. Inwardly from the short arcuate projections 111, long arcuate projections 113, conventionally thinner and smaller, are placed on the bottom board 11 respectively vis-a-vis the left and right peripheral projections 16, 17. The long arcuate projections 113 are coaxial to each other with a length greater than two corresponding short arcuate projections 111. On the top surface of the bottom board 11, a projecting ring 112 is arranged vis-a-vis a central periphery of the central hole of the disc 10 while a holding member 18 is further placed vis-a-vis the central hole of the disc 10. The holding member 18 is composed of at least three portions. Each portion respectively has an arcuate positioning tongue 181 and an arcuate holding tongue 182 to position and hold the disc 10, as shown in FIG. 2 through FIG. 4. A protuberance 184 is located on an upper portion of the outer surface of the arcuate holding tongue 182 to position and hold the disc 10 by engaging its central hole. The arcuate positioning tongue 181 has a lateral contour longer than that of the arcuate holding tongue 182, and an outer surface of the tongue 181 is upwardly curved into a rounded profile 183.

The top cover 2 includes a top board 21 whose left, front, and rear outer peripheries are respectively provided with projecting peripheral segments 24, 22, 23, while the right outer periphery is opened. Furthermore, connecting segments 26 are placed proximate to the left peripheral segment 24 and respectively spaced apart from the front/rear peripheral segments 22, 23 via spacing grooves 25. A pivot hole 261 is defined through each connecting segments 22, 23 to engage with the pivot axle 191 of the connecting segments 19. Attachment grooves 221, 231 are further defined in the front and rear peripheral segments 22, 23 to engage with protuberances 121 respectively formed on the front and rear peripheral projections 12, when the bottom and top covers 1, 2 are closed by folding onto each other.

On the top cover 21, a long holder bar 27 is placed proximate to the left peripheral segment 24 while pair of short holder bars 28 is placed proximate to the right peripheral side of the top cover 21. A pair of transversal flanges 29 respectively project inwardly from an inner surface of the front and rear peripheral segments 22, 23, and engage the inwardly recessed portions 14 of the bottom board 11. A slot 291 is further respectively defined through each transversal flange 29 of the top board 21.

With the above case structure, the disc 10 is held in or released from the disc case by means of the protuberance 184 and the resilience property of the material that constitutes the arcuate holding tongue 182. The deviation of the arcuate holding tongue 182 is therefore limited. The above conventional case structure may be subjected to various deficiencies, as described hereafter. For example, the protuberance 184 may be easily broken or the arcuate holding tongue 182 may be deformed. Furthermore, the bottom surface of the arcuate holding tongue 182 is coplanar with the bottom surface of the bottom board 11. As a result, the pressure exerted on the arcuate holding tongue 182, when the disc 10 is taken, can generate a negative stress on the contact portion of the bottom surface of the arcuate holding tongue 182 with the bottom surface of the bottom board 11. Although a resulting deviation may not be significant, this deficiency however may cause the holding member 18 not to be durable. Therefore, a ringed recess 185 is usually defined on the periphery of the holding member 18 to relieve stress. However, this disposition does not provide satisfactory results with respect to the durability of the holding member.

SUMMARY OF THE INVENTION

It is therefore a principal object of the invention to provide an optical disc case structure that overcomes the above problems by having a more reliable holding member. It is another object of the invention to provide an optical disc case structure that has a reduced dimensional size so that it can be disposed in a smaller occupation space.

Furthermore, it is another object of the invention to provide an optical disc case structure that allows an easy opening of the disc case and an easy take-up of the disc placed therein.

To accomplish the above and other objectives, an optical disc case structure of the invention comprises a bottom cover and a top cover that are pivotally mounted to each other. The bottom cover respectively comprises a bottom board, a front peripheral projection, a rear peripheral projection, a take-up/put-in groove, a protruding ring, a left peripheral projection, a right peripheral projection, a plurality of first connecting segments respectively provided with pivot axles, and a holding member. The top cover comprises a top board, a left peripheral segment, a front peripheral segment, a rear peripheral segment, and a plurality of second connecting segments respectively provided with pivot holes.

The bottom cover and the top cover pivotally assemble with each other via the pivot axles engaging the pivot holes. The holding member comprises at least two pairs of arcuate positioning tongues and arcuate holding tongues. The arcuate positioning and holding tongues together form the holding member that projects approximately perpendicular to the bottom board to engage a central hole of a disc. Each arcuate positioning tongue has an inner surface thereof upwardly extending in inclined and taper manners while an outer surface thereof upwardly bends into a rounded profile. Each arcuate holding tongue is spaced apart from and adjacent to at least one arcuate positioning tongue. Each arcuate holding tongue is connected to the bottom board via a connection in which a U-shaped clearance is defined. The clearance is cut through the bottom board so that the arcuate holding tongue is thereby enabled to resiliently deviate. Furthermore, each arcuate holding tongue is integrally inclined outwardly meanwhile projecting toward the received disc. A bottom surface of each arcuate holding tongue is connected to an outer bottom surface of the bottom board. The bottom surface of the arcuate holding tongue appears as a face upwardly inclined from the outer bottom surface of the bottom board, formed from a notch that is accomplished into the outer bottom surface of the bottom board. A ringed groove is further defined between an inner top surface of the bottom board and the arcuate holding tongue.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows.

DETAILED DESCRIPTION OF THE EMBODIMENTS

Wherever possible in the following description, like reference numerals will refer to like elements and parts unless otherwise illustrated.

Figure 5:
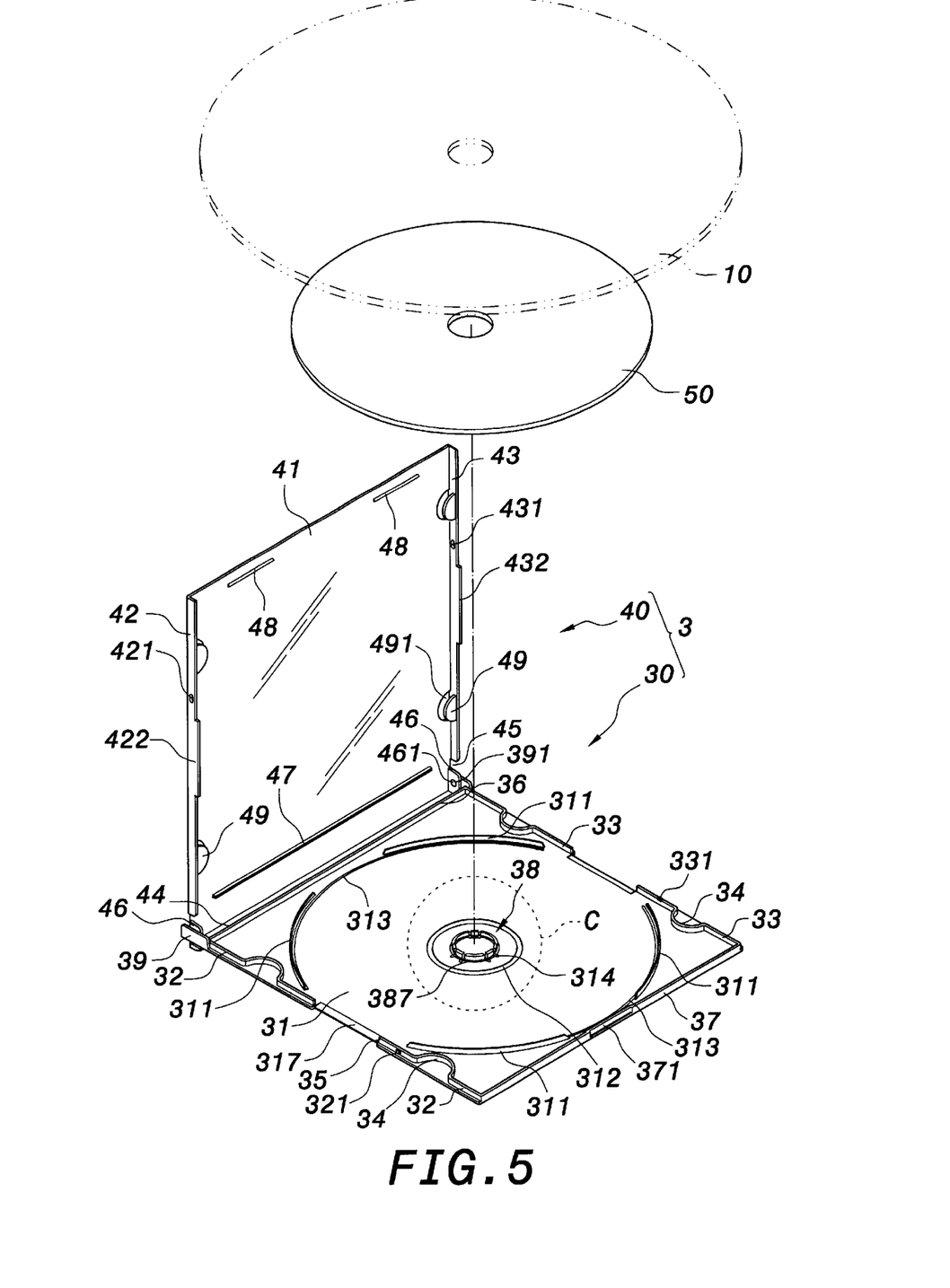
FIG. 5 is a perspective view of an optical disc case structure according to an embodiment of the invention.
Figure 6:
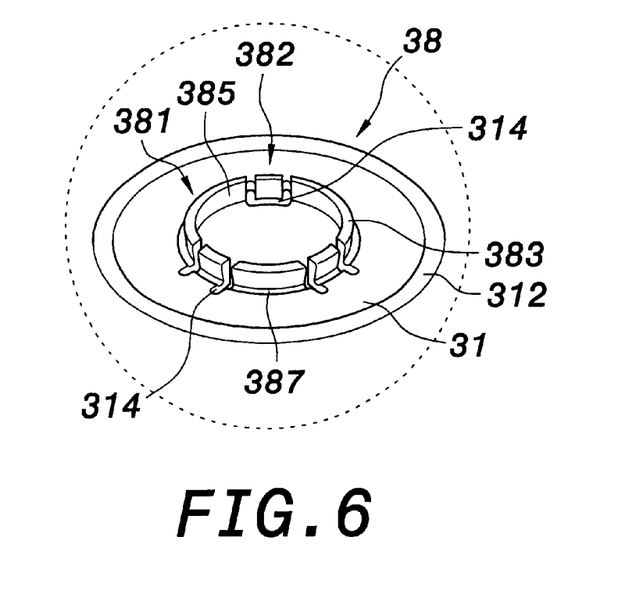
FIG. 6 is an enlarged view of the portion C of FIG. 5.
Figure 7:
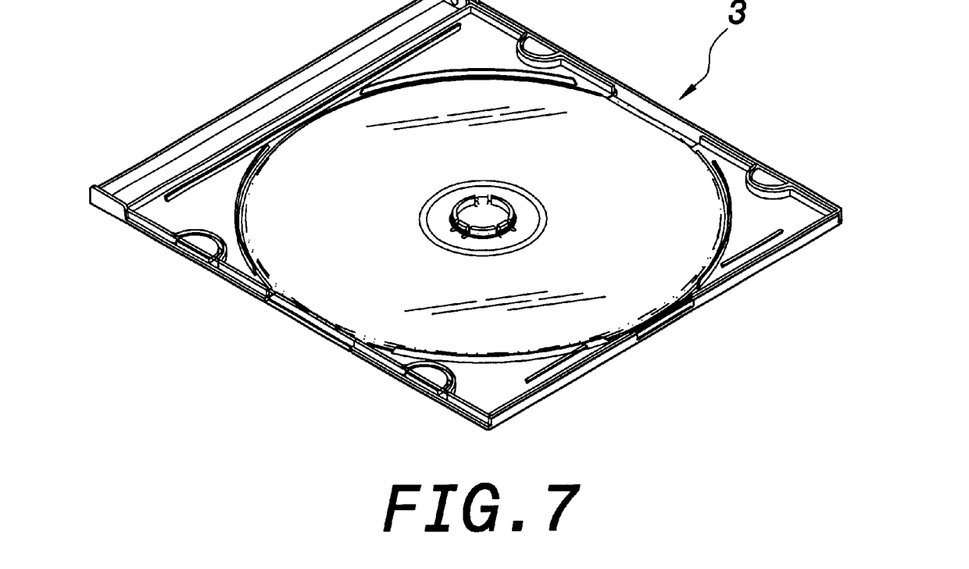
FIG. 7 is a perspective view of the optical disc case structure of the invention in a closing configuration.

Referring to FIG. 5 and FIG. 7, two perspective views schematically show a structure of disc case according to an embodiment of the invention. A disc case 3 comprises a bottom cover 30 and a top cover 40 that are mounted to each other via a pivot. Thereby, the bottom cover 30 and the top cover 40 rotatably unfolds or folds onto each other to achieve opening or closing of the disc case 3. The disc case 3 is closed up with both bottom and top covers 30, 40 engaging into each other.

The bottom cover 30 includes a bottom board 31. A front peripheral projection 32 and a rear peripheral projection 33 are projecting proximate to a front outer periphery and a rear outer periphery of the bottom cover 30. Each of the front and rear peripheral projections 32, 33 is comprised of a pair of projecting elements symmetrical to each other. Each projecting element includes, at a central zone thereof, a recessed portion 34 recessed inwardly toward an inner zone of the bottom board 31. Both symmetrical projecting elements of each of the front and rear peripheral projections 32, 33 are spaced apart from each other via a take-up/put-in groove 35. The groove 35 enables a user, via his/her fingers, to either take up or put a disc 50 in the disc case 3. A left peripheral projection 36 and a right peripheral projection 37 further respectively protrude from a left outer periphery and a right outer periphery of the bottom board 31. A recess 371 is particularly defined in a central portion of the right peripheral projection 37 to allow the opening of the top cover 40. The left and right peripheral projections 36, 37 are further connected to the front and rear peripheral projections 32, 33 to form a frame in which a placement space is defined to receive the disc 50. The bottom cover 30 can be, for example, made of an opaque material. The inwardly recessed portion 34 can be, for example, semicircular or rectangular. An inclined face 317 is further formed proximate to the groove 35 of the bottom board 31.

Figure 8:
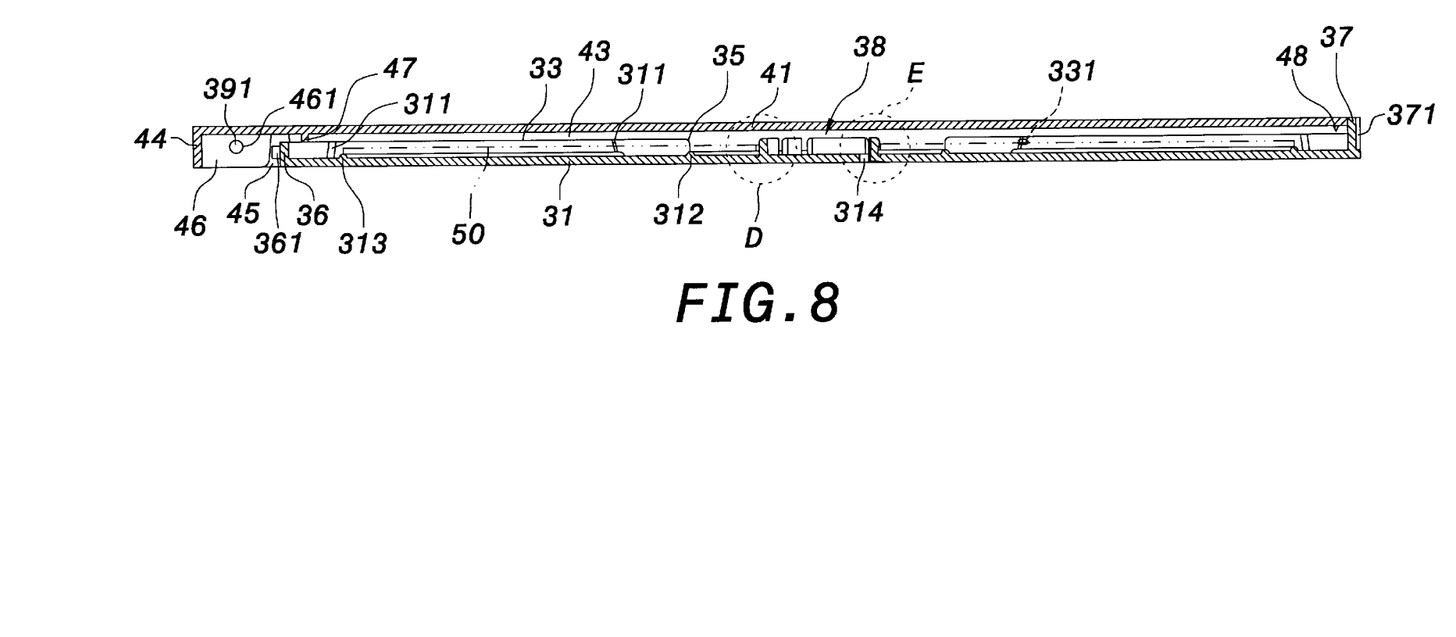
FIG. 8 is a cross-sectional view taken from a transversal section of FIG. 7.
Figure 9:
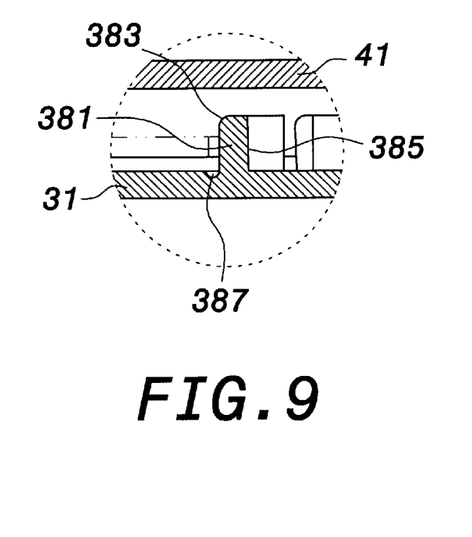
FIG. 9 is an enlarged view of the portion D of FIG. 8.

Short arcuate projections 311 are projecting from a top surface (reference numeral 316) of the bottom board 31 to fit the outer diameter of the disc 50. The short arcuate projections 311 are defined from a single circle having a diameter slightly greater than the diameter of the disc 50 in order to receive the disc 50. Preferably, the short arcuate projections 311 are respectively placed vis-a-vis the corners of the bottom board 31. For example, a pair of short arcuate projections 311 can be placed at two opposite sides of the groove 35 vis-a-vis the corners of the bottom board 31. Long arcuate projections 313 are placed inwardly from the short arcuate projections 311 in a manner to be respectively vis-a-vis each pair of short arcuate projections 311. The long arcuate projections 313 are defined from a circle that is approximately concentric with the short arcuate projections 311 and further has a diameter slightly smaller than the diameter of the disc 50. For example, a long arcuate projection 313 may be placed at two opposite sides of the groove 35 respectively corresponding to a pair of short arcuate projections 311, as exemplary described above and in FIG. 5. The short and/or long arcuate projections 311, 313 thereby form a peripheral receptacle structure that receives the disc 50 supported through its outer peripheral portion, as shown in FIG. 8.

Furthermore, a central holding structure is formed on the bottom board 31 to hold a central portion of the disc 50. On the bottom board 31, the central holding structure is provided with a protruding ring 312 that is vis-a-vis a central periphery of the central hole usually provided on the disc 50. The central portion of the disc 50 can be thereby supported in the disc case 3. The protruding ring 312 and the long arcuate projections 313 slightly protrude over the bottom board 31 with an approximately similar height. As shown in FIG. 8, the short arcuate projections 311 protrude into a lip shape that is higher than the height of the disc 50 placed in the disc case 3, the disc 50 is thereby protected from potentially damaging pressures.

Figure 10:
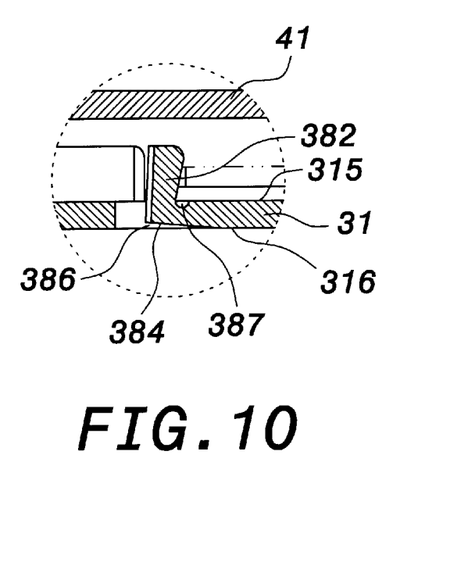
FIG. 10 is an enlarged view of the portion E of FIG. 8.

Referring to FIG. 6, FIG. 8, FIG. 9, and FIG. 10, a holding member 38 is arranged on the bottom board 31, within the protruding ring 312. The central hole of the disc 50, usually having a diameter of 8 cm, is thereby positioned and held by engaging the holding member 38. The holding member 38 comprises three portions, each portion respectively has an arcuate positioning tongue 381 and an arcuate holding tongue 382 that enable the disc 50 to be positioned and fixedly held in the disc case 3. The arcuate positioning tongue 381 of the holding member 38 is arranged approximately perpendicular to the bottom board 31. The arcuate positioning tongue 381 has its inner surface 385 upwardly extending in inclined and taper manners while its outer surface upwardly bends into a rounded profile 383. The arcuate holding tongue 382 is spaced apart from and adjacent to the arcuate positioning tongue 381. The arcuate holding tongue 382 is connected to the bottom board 31 via a connection in which a U-shaped clearance 314 is defined. The clearance 314 is cut through the bottom board 31 so that the arcuate holding tongue 382 is thereby enabled to resiliently deviate. Furthermore, the arcuate holding tongue 382 is integrally inclined outwardly meanwhile projecting toward the disc 50. An inclined surface 384 of the arcuate holding tongue 382 is connected to an outer bottom surface 316 of the bottom board 31. The inclined surface 384 appears as a face upwardly inclined from the outer bottom surface 316, formed from a notch 386 that is accomplished into the outer bottom surface 316, as shown in FIG. 10. A ringed groove 387 is further defined between an inner top surface 315 of the bottom board 31 and the arcuate holding tongue 382. It should be readily appreciated that the holding member 38 may be alternatively placed on the top cover 40, in which case, the short and long arcuate projections, and the protruding ring should be also placed on the top cover 40 to adequately receive and hold the disc 50.

The front and rear peripheral projections 32, 33 respectively terminate into a connecting segment 39 on the side of the left peripheral projection 36. The connecting segments 39 respectively include pivot axles 391 that are coaxially vis-a-vis each other. The pivot axles 391 may be alternatively directly placed on the front and rear peripheral projections 32, 33.

The top cover 40 includes a top board 41. On a bottom surface of the top board 41, a plurality of peripheral segments 44, 42, 43 downwardly project from, respectively, a left, front, and rear peripheral side to form a U-shaped peripheral frame. The top board 41 is slightly larger than the bottom board 31. Connecting segments 46 are respectively spaced apart from the front and rear peripheral segments 42, 43 via spacing grooves 45 that are placed proximate to the left peripheral segment 44. Each connecting segment 46 of the top board 41 is provided with a pivot hole 461, and is placed vis-a-vis one connecting segment 39 of the bottom board 31. Thereby, one pivot axle 391 engages into the pivot hole 461 to pivotally assemble the top cover 40 with the bottom cover 30. Alternatively, the pivot hole may be directly defined on the peripheral segments 42, 43.

The top cover 40 closes down by folding onto the bottom cover 30 with the front and rear peripheral segments 42, 43 covering over the front and rear peripheral projections 32, 33. When the top cover 40 and the bottom cover 30 are hence folded onto each other, extending portions 422 of the front and rear peripheral segments 42, 43 are respectively located adjacently vis-a-vis the take-up/put-in grooves 35.

Furthermore, the front and rear peripheral segments 42, 43 adjacently engage over the front and rear peripheral projections 32, 33 by abutting against an outer surface thereof. Because the top cover 40 is larger than the bottom cover 30, the left peripheral segment 44 of the top cover 40 is outwardly located with respect to the left peripheral projection 36, thereby forming a grooved space there between. When the disc case 3 is closed, the user via his/her fingers can thereby disengage the disc case 3 via pushing toward the left peripheral segment 44.

Attachment grooves 421, 431 are further respectively defined through the front and rear peripheral segments 42, 43 of the top cover 40. Meanwhile, attachment protuberances 321, 331 are correspondingly placed on an outer surface of the front and rear peripheral projections 32, 33, respectively. The top cover 40 is thereby fastened to the bottom cover 30 via the attachment protuberances 321, 331 respectively engaging into the attachment grooves 421, 431. The attachment grooves 421, 431 can be, for example, through holes.

Figure 11:
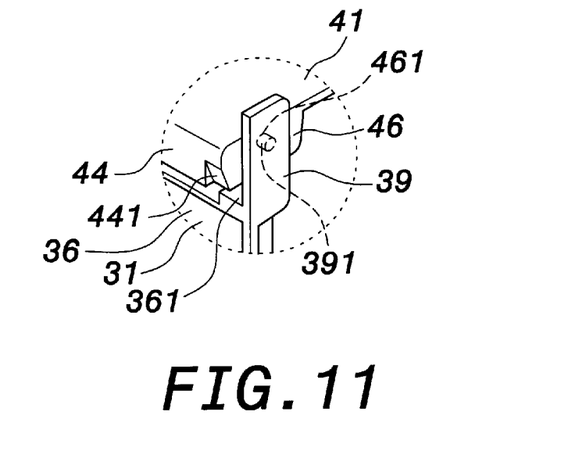
FIG. 11 is an enlarged view showing the pivot assembly of the top cover with the bottom cover according to an embodiment of the invention.

As shown in FIG. 11, the left peripheral segment 44 of the top board 41 oppositely terminates into two ending portions in which notches 441 are respectively defined. The left peripheral projection 36 oppositely terminates into two ending portions that are respectively provided with stopping protuberances 361 corresponding to the notches 441. When the top cover 40 and the bottom cover 30 are unfolded 180 degrees, the stopping protuberances 361 engages into the notches 441, thereby blocking further rotation of the top cover 40.

As shown in FIG. 5, a long holder bar 47 longitudinally projects from the top board 41 at a location proximate to the left peripheral segment 44 while a pair of short holder bars 48 is placed proximate to the left side of the top board 41. A pair of transversal flanges 49 respectively project inwardly from an inner surface of the front and rear peripheral segments 42, 43, and engage the inwardly recessed portions 34 of the bottom board 31. A slot 491 is further respectively defined through each transversal flange 49 of the top board 41. Thereby, a notice or presentation card can be inserted on the top board 41 in the slot 491, and between the transversal flanges 49 and the holder bars 47, 48. The top cover 40 is made of a transparent material, and the disc case 3 can be achieved with a thickness below 5 mm.

Figure 12:
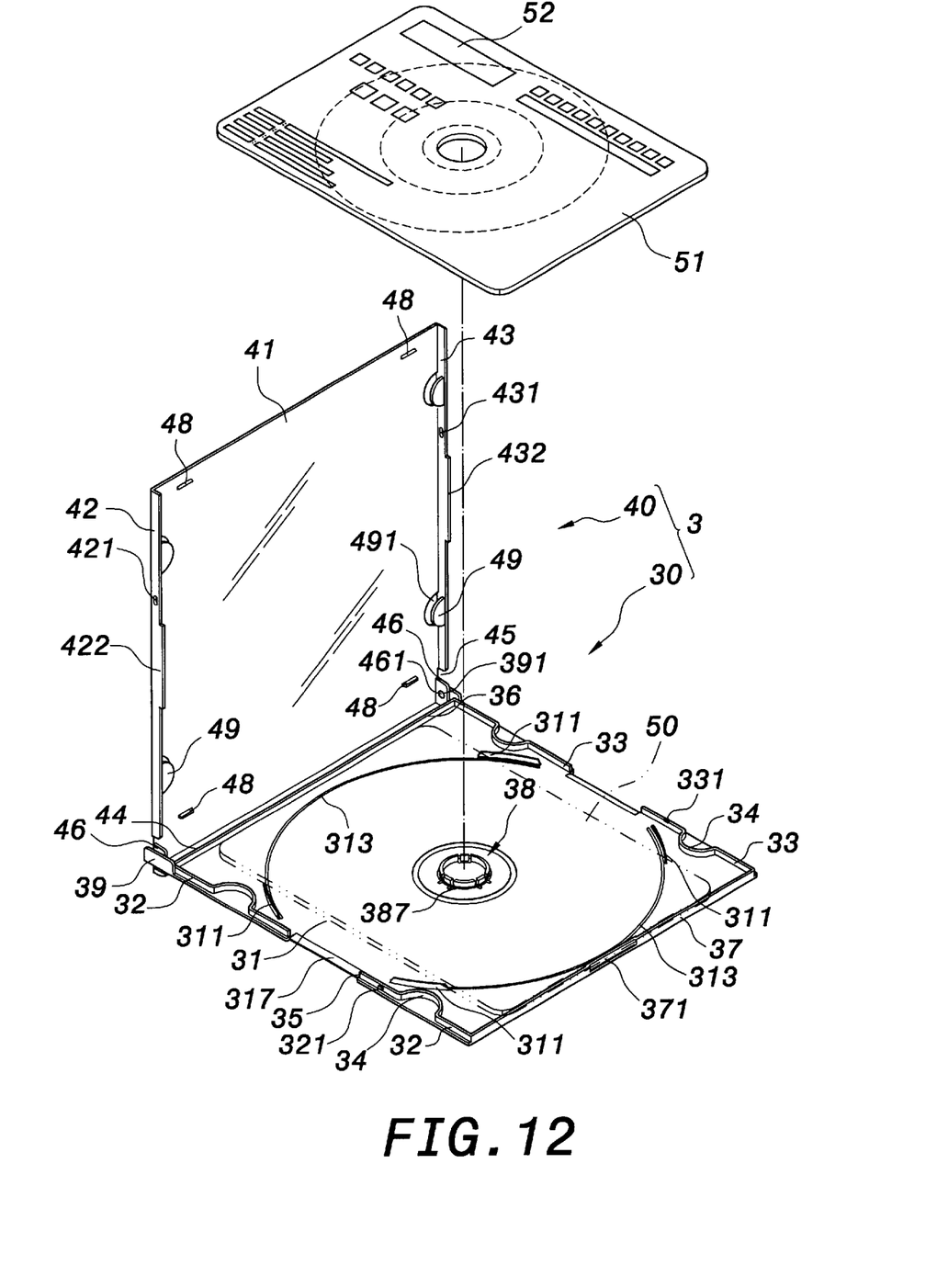
FIG. 12 is a perspective view of an optical disc case structure according to another embodiment of the invention where a rectangular data support is received.

As shown in FIG. 12, besides circular discs, the case structure of the invention can also adequately receive a rectangular data support 51 with a printing text 52 thereon. To accommodate the rectangular data support 51, the length of the short arcuate projections 311 is reduced. Meanwhile, the distance between two facing ends of each pair of short arcuate projections 311, on a same side with respect to the groove 35, is approximately equal to the width of the data support 51. The rectangular data support 51 has a length that is slightly smaller than the distance from the left peripheral projection 36 to the right peripheral projection 37. Furthermore, the long and short holder bars 47, 48 are replaced with short holder bars 48 that are placed at the four corners of the top board 41. Thereby, the invention can accommodate various shapes of data support.

In conclusion, the invention uses a simple structure comprised of top and bottom covers to form a relatively thin disc case 3. The disc case structure of the invention differs from the conventional structure with respect to various aspects. One specific aspect is the holding member 38 and, more particularly, the arrangement of the arcuate holding tongue 382 that differs from the conventionally straight erected arrangement in that it is slightly inclined. Hence, no protruding portion is needed, which thereby favorably eliminates the problems of mold removal. As a result, the manufacture of the holding member of the invention is facilitated and, furthermore, the holding member has an improved resilience to enable an easy placement and take up of the disc from the disc case. The holding member further is more resistant and does not easily break off. Therefore, it favorably provides a durable use.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An optical disc case comprising:

a bottom cover including a bottom board, a front peripheral projection, a rear peripheral projection, a left peripheral projection, and a right peripheral projection; the front and rear peripheral projections respectively being composed of a pair of projecting elements that are spaced apart from each other via a take-up/put-in groove, the front and rear peripheral projections being further respectively provided with an attachment protuberance; a top surface of the bottom board respectively including a plurality of short arcuate projections concentrically disposed in paired manner, a long arcuate projection being further concentrically placed inward to each pair of short arcuate projections; a protruding ring being further placed inward to the long arcuate projection; and a plurality of first connecting segments, respectively provided with a pivot axle, further respectively extending from the front and rear peripheral projections;

a top cover including a top board, a left peripheral segment, a front peripheral segment, and a rear peripheral segment; a plurality of second connecting segments being respectively spaced apart from the front and rear peripheral segments via a respective spacing groove, the second connecting segments being respectively provided with a pivot hole to engage with the pivot axles to pivotally assemble the top cover with the bottom cover; an attachment groove being further respectively defined through the front an rear peripheral segments to engage with the attachment protuberances; and a holding member formed on the bottom board, and defined via at least two pairs of arcuate positioning tongues and arcuate holding tongues, the holding member cylindrically projecting from the bottom board to receive and hold an optical disc via engaging a central hole thereof, each arcuate positioning tongue having an inner surface thereof upwardly extending in inclined and taper manners while an outer surface thereof upwardly bends into a rounded profile; each arcuate holding tongue being spaced apart from and adjacent to at least one arcuate positioning tongue; each arcuate holding tongue being connected to the bottom board via a connection in which a U-shaped clearance is defined via cutting through the bottom board so that the arcuate holding tongue is capable to resiliently deviate; each arcuate holding tongue being integrally inclined outwardly meanwhile projecting toward the received disc; a bottom surface of each arcuate holding tongue being upwardly inclined with respect to an outer bottom surface of the bottom board to which the arcuate holding tongue is connected; a ringed groove being further defined between an inner top surface of the bottom board and each arcuate holding tongue.

2. The case structure of claim 1, wherein two end portions of the left peripheral segment are respectively provided with a protuberance corresponding to a hole respectively provided at two end portions of the left peripheral projection.

3. The case structure of claim 1, wherein a holder bar is placed proximate to the left peripheral segment and/or a pair of short holder bars are placed proximate to the right peripheral segment.

4. The case structure of claim 1, wherein two short arcuate projections are placed oppositely with respect to the take-up/put-in groove, thereby being spaced apart from each other via a distance slightly greater than the width of a rectangular data optical support.

5. The case structure of claim 1, wherein each projecting element of the front and rear peripheral projections includes a recessed portion.

6. The case structure of claim 1, wherein an opening groove is defined on an outer surface of the right peripheral projection.

7. The case structure of claim 1, wherein an inclined face is defined proximate to the take-up/put-in groove of the bottom board.

8. The case structure of claim 1, wherein the bottom cover and the top cover are made of an opaque material.

9. The case structure of claim 1, wherein at least a transversal flange is respectively defined on an inner surface of the front and rear peripheral segments.

10. The case structure of claim 1, having a thickness smaller than 5 mm.

* * * * *